(12) United States Patent
Badri et al.

(10) Patent No.: US 11,796,434 B2
(45) Date of Patent: Oct. 24, 2023

(54) APPARATUS AND METHOD FOR TESTING ROCK HETEROGENEITY

(71) Applicant: SCHLUMBERGER TECHNOLOGY CORPORATION, Sugar Land, TX (US)

(72) Inventors: Mohammed Badri, Al-Khobar (SA); Devon Gwaba, Kennesaw, GA (US); Gallyam Aidagulov, Dhahran (SA); Mustapha Abbad, Al-Khobar (SA); Salah Mohammed Al-Ofi, Northern Khobar (SA)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 987 days.

(21) Appl. No.: 16/543,006

(22) Filed: Aug. 16, 2019

(65) Prior Publication Data

US 2021/0048382 A1 Feb. 18, 2021

(51) Int. Cl.
*G01N 3/46* (2006.01)
*E21B 47/12* (2012.01)
(Continued)

(52) U.S. Cl.
CPC ............ *G01N 3/46* (2013.01); *E21B 49/00* (2013.01); *E21B 49/02* (2013.01);
(Continued)

(58) Field of Classification Search
CPC ............ G01N 3/46; G01N 2203/0244; G01N 2203/0274; G01N 2203/0053;
(Continued)

(56) References Cited

U.S. PATENT DOCUMENTS 4,719,803 A * 1/1988 Capelle ............... E21B 49/006
73/784
5,216,917 A 6/1993 Detournay
(Continued)

FOREIGN PATENT DOCUMENTS

EP 0559286 A1 9/1993

OTHER PUBLICATIONS

Adachi, J. I. et al., "Determination of rock strength parameters from cutting tests", in Rock mechanics Tools and Techniques, proc. of the 2nd North American Rock Mechanics Symposium (NARMS'96), Montreal, Balkema, Rotterdam, 1996, pp. 1517-1523.
(Continued)

*Primary Examiner* — Farhana A Hoque
*Assistant Examiner* — Joseph O Nyamogo
(74) *Attorney, Agent, or Firm* — Jeffrey D. Frantz

(57) ABSTRACT

A scratch tester has at least one cutter that moves simultaneously both rotationally and axially relative to the rock it is cutting. When rotational and axial movements are constant, the cutter generates a helical groove in the rock. In borehole embodiments, the scratch tester is fixed at a desired location using centralizers, and the cutter is provided on a motorized platform/track that translates between the centralizers and rotates around a central axis. The cutter faces outward and extends via a cutter arm to engage and carve a helical groove in the borehole wall. A laboratory scratch tester includes a holder for a solid cylindrical core sample and a motorized translating frame on which a cutter extends. The cutter is directed toward the core sample, and the holder with the core sample is rotated by a motor so that as the cutter translates relative thereto, a helical groove is cut thereinto.

27 Claims, 7 Drawing Sheets

(51) Int. Cl.
  E21B 49/00       (2006.01)
  E21B 49/02       (2006.01)
  E21B 17/10       (2006.01)

(52) U.S. Cl.
  CPC .......... *E21B 17/1021* (2013.01); *E21B 47/12* (2013.01); *G01N 2203/0244* (2013.01); *G01N 2203/0274* (2013.01)

(58) Field of Classification Search
  CPC ...... E21B 49/00; E21B 49/02; E21B 17/1021; E21B 47/12; E21B 49/005
  See application file for complete search history.

(56) References Cited

U.S. PATENT DOCUMENTS

| | | | |
|---|---|---|---|
| 5,323,648 | A | 6/1994 | Peltier et al. |
| 5,670,711 | A | 9/1997 | Detournay et al. |
| 6,378,627 | B1 * | 4/2002 | Tubel .................. E21B 17/1078 166/255.2 |
| 7,921,730 | B2 | 4/2011 | Tan |
| 9,482,087 | B2 | 11/2016 | Badri et al. |
| 2010/0269578 | A1 | 10/2010 | Detournay et al. |
| 2013/0269931 | A1 * | 10/2013 | Badri .................. G01V 11/005 73/152.01 |
| 2015/0354306 | A1 * | 12/2015 | Fuller .................. E21B 17/1078 166/55.7 |
| 2018/0106708 | A1 | 4/2018 | Siebrits et al. |
| 2018/0328827 | A1 * | 11/2018 | Martysevich ............ G01N 3/42 |

OTHER PUBLICATIONS

Detournay, E. et al. "A Phenomenological Model for the Drilling Action of Drag Bits", International Journal of Rock Mechanics and Mining Sciences & Geomechanics Abstractacts, 1992, 29(1), pp. 13-23.

Detournay, R. T. et a., "The scratch test as a means to measure strength of sedimentary rocks", SPE-47196, presented at SPE/ISRM Rock Mechanics in Petroleum Engineering, Trondheim, Norway, 1998, pp. 15-22.

Naeimipour, A. et al., "Applications of rock strength borehole probe (RSBP) in underground openings", ISRM-EUROCK-2016-196, presented at the ISRM International Symposium—EUROCK 2016, Urgup, Turkey, pp. 1213-1218.

Schei, G. et al., "The Scratch Test: An Attractive Technique for Determining Strength and Elastic Properties of Sedimentary Rocks", SPE 63255, presented at the SPE Annual Technical Conference and Exhibition, Dallas, Texas, U.S.A., 7 pages.

Suarez-Rivera, R. et al. "Continuous Rock Strength Measurements on Core and Neural Network Modeling Result in Significant Improvements in Log-Based Rock Strength Predictions Used to Optimize Completion Design and Improve Prediction of Sanding Potential and Wellbore Stability", SPE84558-MS, presented at the 2003 SPE Annual Technical Conference and Exhibition in Denver, Colorado, U.S.A., 9 pages.

Suarez-Rivera, R. et al., "Continous Scratch Testing on Core Allows Effective Calibration of Log-Derived Mechanical Properties for Use in Sanding Prediction Evaluation", SPE-78157, presented at the SPE/ISRM Rock Mechanics Conference, Irving, Texas, U.S.A., 2002, 7 pages.

* cited by examiner

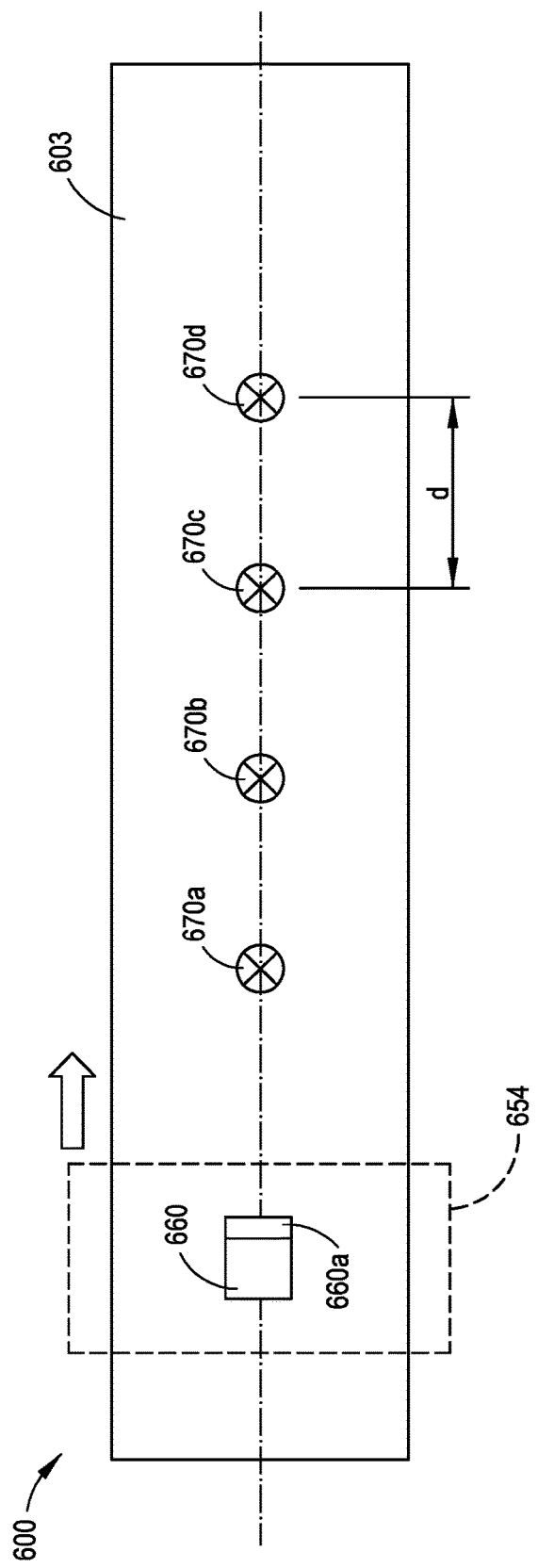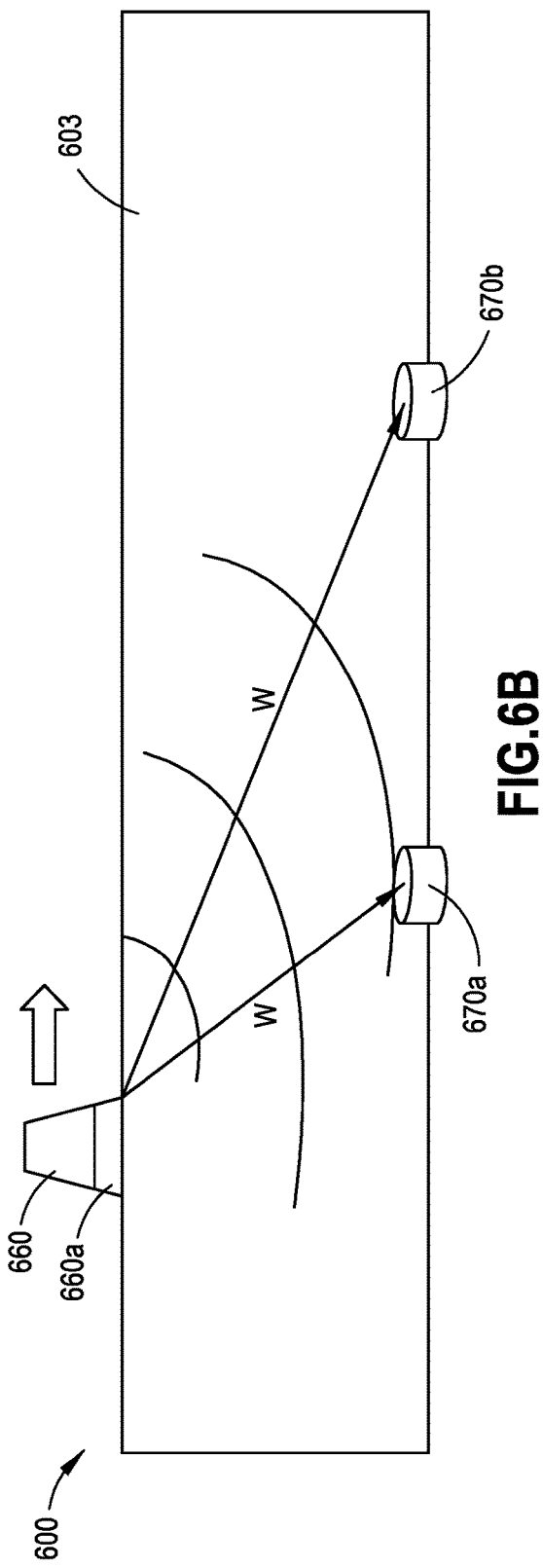

APPARATUS AND METHOD FOR TESTING ROCK HETEROGENEITY

FIELD

The subject disclosure relates to the evaluation of geological rock formations. More particularly, the subject disclosure relates to apparatus and methods for scratch testing core samples and formations traversed by a borehole.

BACKGROUND

In reservoir geomechanics, characterization of rock mechanical properties and geological core descriptions at both laboratory and reservoir scales are fundamental to the analysis of wellbore stability, sanding potential, mud weight requirements, casing collapse, compaction potential, hydraulic fracturing, and many other applications related to the mechanical stability of the well and the reservoir. Currently, the conventional method of obtaining continuous reservoir data profiles is through electrical downhole logging and index laboratory tests. However, measurements of rock properties in heterogenous formations is a challenging activity. The scratch test is used for continuous measurements of rock strength by cutting (scratching) the rock surface. Tangential and normal forces necessary to create this scratch in the core outer surface or in its slabbed face are used to calculate the unconfined or uniaxial compressive strength (UCS) profile.

Scratch-test apparatus for measuring the strength of rocks in the laboratory and in field tools are known. See for example, U.S. Pat. Nos. 5,323,648, 5,216,917 which are hereby incorporated by reference herein in their entireties. Comprehensive descriptions of the testing procedures can be found in: Detournay, E. et al., "A phenomenological model for the drilling action of drag bits," Int. J. Rock Mech. Min. Sci & Geomech. Abstr. Vol. 29, No. 1, pp. 13-23, 1992; Schei, G. et al., "The scratch test: an attractive technique for determining strength and elastic properties of sedimentary rocks," SPE-63255-MS, SPE Annual Technical Conference and Exhibition, 1-4 October, Dallas, Texas, 2000; and Suarez-Rivera, R. et al., "Continuous scratch testing on core allows effective calibration of log-derived mechanical properties for use in sanding prediction evaluation", SPE-78157-MS, SPE/ISRM Rock Mechanics Conference, 20-23 October, Irving, Texas, 2002. A cutter applies a normal and tangential force on the surface of the rock sample as it scratches a small groove of constant depth while moving at constant velocity. A computerized control system measures the resultant force that is required to cut the sample at this constant depth of cut. From these measurements, the intrinsic specific energy is computed and correlated to the uniaxial compressive strength (UCS). In addition to UCS, Young's modulus, cohesion, and the internal friction angle of the rock (friction coefficient) can also be estimated. This technique provides a simple means of logging the heterogeneity of rock strength along the tested core length.

Uses of scratch-test apparatus in downhole operations are also described. For example, in U.S. Pat. No. 5,323,648 a tool for measuring the mechanical properties of a formation through the borehole is provided. Similarly, U.S. Pat. No. 7,921,730, which is hereby incorporated by reference herein in its entirety, describes a downhole rock scratcher tool and method for measuring the relative strength of subsurface formation intervals. U.S. Pat. No. 9,482,087, which is hereby incorporated by reference herein in its entirety, describes a geomechanical logging tool with transducers located on a sharp tip of an extendable arm of the tester. Naeimipour, A., et al., "Applications of Rock Strength Borehole Probe (RSBP) in Underground Openings", ISRM International Symposium—EUROCK 2016, 29-31 Aug., Ürgüp, Turkey, 2016 describes a rock strength borehole probing (RSBP) tool with a probe that measures the normal and rolling forces on the scribe (cutter) that is pressed against the wall surfaces of the borehole.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, a scratch tester includes a cutter arm and a cutting element extending from the cutter arm, where the cutter arm engages the rock, and the cutter arm controllably moves simultaneously both rotationally and axially relative to the rock to cut a three-dimensional scratch in a rock.

In an embodiment the cutter arm includes at least one of displacement sensors and load sensors. In an embodiment, the scratch tester includes acoustic sensors.

In an embodiment, an apparatus for investigating a formation traversed by a borehole is disclosed. The apparatus includes a tool body; a centralizer extending from the tool body that centers the tool body in the borehole; a platform adapted to move axially along said tool body; an arm coupled to and extending from the platform and adapted to move axially with the platform and rotationally relative to the platform; a sharp cutting element extending from the arm into engagement with a surface of the borehole; and at least one sensor coupled to the arm or the cutting element, with the at least one sensor sensing a property of the formation rock engaged by the cutting element.

In an embodiment, an apparatus for investigating a cylindrical rock sample is disclosed. The apparatus includes a holder for the rock sample, the holder adapted to rotate about a longitudinal axis of the rock sample; a cutter arm having a sharp cutter element extending from the arm and into contact with the rock sample; a support for the cutter arm, the support adapted to move axially parallel the longitudinal axis; a rotational movement sensor and an axial movement sensor; a data acquisition system coupled to the rotational movement sensor and the axial movement sensor; at least one sensor coupled to the arm, the sharp cutter element, and the support, the at least one sensor sensing a property of the rock engaged by the sharp cutter element; and a user interface electrically coupled to the holder and to the support and adapted to permit a user to control axial movement of said support and rotation of the holder and to display a property of the rock as a function of the rock circumference.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIGS. 6a and 6b are partial top and side views of a scratch test system such as in FIG. 3 but with added acoustic sensors;

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice.

Figure 1:
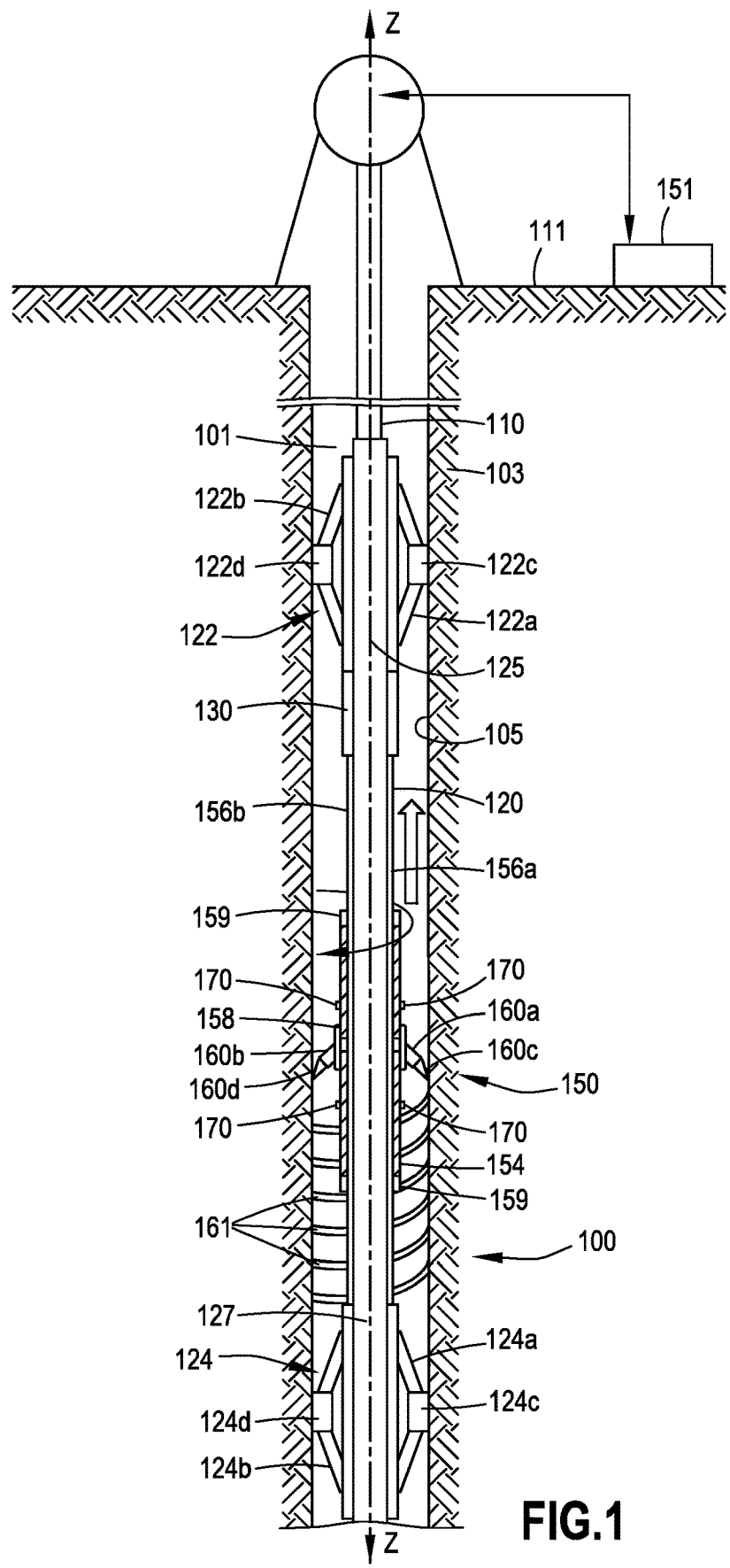
FIG. 1 is a schematic of a scratch tester logging tool having cutter arms that are rotationally and translationally movable and controllable.

Turning to FIG. 1, a scratch borehole tool 100 is seen deployed in a wellbore 101 traversing a formation 103 with wellbore/formation surface 105. The borehole tool 100 may be supported by a wireline or coiled tubing 110 extending from the surface 111 of the formation and may be deployed in vertical, deviated, or horizontal wells. In the embodiment of FIG. 1, tool 100 is provided with tool body 120 having centralizers 122, 124 at respective portions 125, 127 of the body, a motor, power supply and telemetry module 130 and a scratching or cutting module 150. The centralizers 122, 124, each include extensible arms 122a, 122b, 124a, 124b and soft contact dampers 122c, 122d, 124c, 124d. During deployment of the tool, the centralizers are closed. When a target zone of the well is reached, the centralizers 122, 124 are remotely activated from the surface electrically so that their rubber dampers 122c, 122d, 124c, 124d contact the surface of the wellbore. As a result, the tool is held in a fixed position without damaging the surface of the wellbore. In addition, the centralizers assure that the scratching (cutting) module 150 is located along the central axis Z-Z of the wellbore.

The motor, power supply and telemetry (MPST) module 130 is shown adjacent to centralizer module 122. MPST module 130 serves to transmit data measured by sensors on the cutter module 150 to the equipment 151 on the surface of the formation. MPST module 130 may also include motors and/or power to electrically drive the cutter module 150 and its sensors.

The cutter module 150 is shown between the centralizer modules 122, 124. The cutter module 150 includes a motorized platform 154 which can translate along the length of tool body 120. In one embodiment, the tool body 120 includes two or more azimuthally spaced axial (longitudinal) slide rails 156a, 156b, and the motorized platform 154 includes fingers (not shown) that extend over and around the respective rails, or slots (not shown) that engage the respective rails. In one embodiment, the motorized platform 154 includes its own groove or slide rail on which a motorized cutter arm ring 158 can rotate. Extending from the cutter arm ring 158 are one or more cutters (two shown) 160a, 160b. The cutters have one or more sharp cutting elements or edges 160c, 160d for cutting (scratching) rock. With the motorized platform 154 on rails 156a, 156b, and the motorized rotating ring 158 on the platform, the cutters 160a, 160b may move both linearly and rotationally relative to the borehole wall 105. The motions are independent but may be simultaneous. When the linear motion and rotational motion are simultaneous, and the ratio of their velocities is constant (e.g., when both is in uniform motion), the cutting elements 160c, 160d each cut a helical groove 161 in the wellbore wall 105.

As described hereinafter, the cutters 160a, 160b are longitudinally rotatable so that they may be withdrawn (folded) from engagement with the borehole or may be extended (unfolded) into engagement with the borehole.

In one embodiment, a sliding damper 159 is installed at each end of the motorized platform 154. The sliding dampers 159 provide a soft stop to the cutter module 150 at the end of its course against the lower centralizer 124 and the MPST module 130.

In one embodiment, the cutting elements 160c, 160d are polycrystalline diamond cutters (PDC scratchers). As previously suggested, the cutters 160a, 160b are longitudinally rotatable so that in one position, the cutters can be horizontally imbedded (folded) in the housing where their "arms" are parallel to the wellbore. This will avoid scratching the surface of the wellbore while deploying the tool downhole or while pulling it out of the wellbore, or while moving the tool to a desired location (target zone) in the wellbore. Once the target zone is reached, the cutters 160a, 160b can be electrically activated (unfolded), e.g., from the formation surface 111, to adjust their inclination angle (i.e., to rotate the arms) in such a way that the cutter elements of the cutters are in contact with the surface 105 of the wellbore.

In one aspect, by simultaneously activating the motorized platform 154 and rotating ring 158 to provide linear (i.e., along the tool/wellbore axis) and rotational motions at constant velocities, the cutters 160a, 160b will scratch the surface 105 of the wellbore with a (double) helical spiral cutting. This trajectory increases the resolution of the scratching profile (in terms of surface of the wellbore which is scratched) compared to the conventional scratching tools which have a linear motion parallel to the axis Z-Z of the wellbore. One advantage from having two cutters 160a, 160b is a redundancy advantage that permits the system to continue the logging if one cutter has failed. A second advantage is that the measurement resolution can be significantly increased due to the increase of the surface of the wellbore which is scratched. A third advantage is that measurements are made that can identify azimuthal heterogeneity of the formation adjacent the borehole in the case that only linear motion of the cutter(s) is activated.

According to one aspect, using a surface equipment 151 and a user interface system (not shown) via the MPST module 130, an operator can adjust the cutter inclination, the cutting depth, and the speeds of the linear and rotational motions in order to reach the desired scratching resolution. This is done by a set of displacement and load sensors installed on the motorized platform 154 and/or the cutter arms. In comparison to conventional, straight scratch systems, the helical scratch brings another advantage of the rock being scratched at different angles. This allows a characterization of the anisotropy of rock strength as described hereinafter.

In one embodiment, a set of acoustic (ultrasound) sensors 170 are installed on motorized platform 154. These sensors can be configured to operate in a passive (receiver) and/or in an active (transmitter) mode. In the passive mode, the sensors can listen to (record) the sound generated by the cutter-rock interaction during scratching. The characteristics of the captured signal (amplitude, spectra) can be correlated to the heterogeneity of the rock. Furthermore, the presence of cavities and non-uniformity of the surface of the wellbore can also be captured independently by the acoustic sensors 170 and displacement and load sensors. A 3-D rock heterogeneity acoustic signal profile is obtained in addition to the uniaxial compressive strength (UCS) profile for improved characterization of the rock heterogeneity. In the active mode, at least one sensor 170 is configured as a sender (transmitter) while one or more other sensors function as receivers of the reflected signal. Thus, the obtained velocity of the reflected signal allows for the determination of dynamic rock properties such as dynamic Poisson's ratio and Young's modulus. Thus, according to one aspect, using the provided tool, the in-situ strength profile of the rock may be obtained along with the profile of dynamic elastic properties of the rock.

Figure 2:
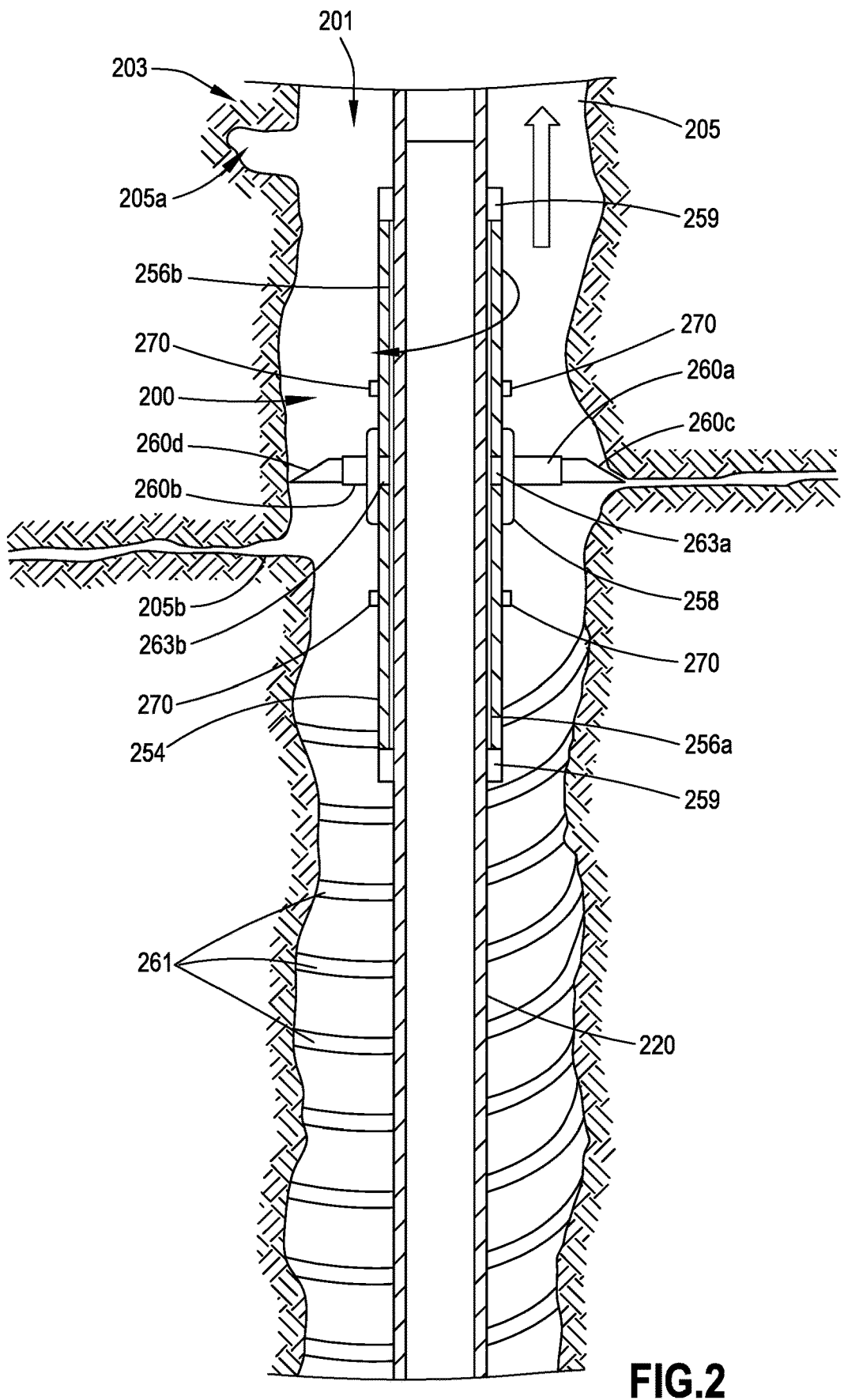
FIG. 2 is a schematic of the translational and rotational portion of another embodiment of a scratch test logging tool in a non-uniform portion of a borehole.

Turning to FIG. 2, the translational and rotational portion of another embodiment of a scratch test logging tool 200 is seen. Tool 200 is seen in a borehole 201 of a formation 203 with the borehole/formation interface having a non-uniform surface 205 including a cavity 205a and fracture 205b. In FIG. 2, the tool is seen with a tool body 220, a motorized platform 254, spaced longitudinal slide rails 256a, 256b, a motorized rotating ring 258 having a finger that engages in a circumferential groove of the motorized platform 254, and dampers 259 on either end of the motorized platform 254. Extending from the ring 258 are cutters 260a, 260b with sharp cutting elements 260c, 260d that cut or scratch grooves 261 in the borehole/formation surface 205. The cutters 260a, 260b are provided with a damping system 263a, 263b which modifies the inclination of the cutters or pushes them in or out of the tool body 220 to compensate for when cutters are in contact with a non-uniform surface as in FIG. 2 (it being appreciated that cutter arm 260b is shown partially pushed into the tool body 220).

In one embodiment, the damping system 263a, 263b is controlled by an operator from the surface with an electrical system causing the cutting to be done at a constant depth. In another embodiment, a caliper probe is provided just ahead of the cutter to measure the actual distance from the tool (cutter) to the rock face. The caliper probe may take the form of acoustic sensors 270. The acoustic sensors 270 may also be used to capture the sound generated by the cutter-rock interaction during scratching. The characteristics of the captured signal (amplitude, spectra) can be correlated to the heterogeneity of the rock. Furthermore, the presence of cavities and non-uniformity of the surface of the wellbore can also be captured. Regardless, using the calipers, the inclination angle of the cutters 260a, 260b can be adjusted based on the distance between the tool and the rock face to ensure constant depth of cut. When fractures 205b or cavities 205a are present at the surface of the wellbore, the cutter inclination angle can be increased up to its maximum position of 90° (and/or the cutter may be pushed completely out of the tool body, depending on implementation). Due to surface discontinuities, in some circumstances a zero tangential force may be measured across the width of the cavities, thereby indicating no scratching. This allows the detection of the presence of the cavity and its width. It also allows detection of the dip of a fracture 205b which may be encountered at one location by cutter 260a and another location by cutter 260b. In one embodiment, the cutters 260a, 260b are independently damped and controlled.

Accordingly, with the provided borehole tools of FIGS. 1 and 2, downhole 3-D rock strength mapping may be performed by helical spiral scratching, which will increase the resolution in the measurement of the unconfined compressive strength. Similarly, the helical spiral cutting borehole tools of FIGS. 1 and 2 permit a 3-D mapping of rock heterogeneity and anisotropy; i.e., an azimuth anisotropy and heterogeneity profile of the rock along the wellbore length. The mapping may be displayed on a monitor or map, be printed as a log with the borehole depth along one axis, and the azimuth (angle) along another axis. Moreover, the borehole tool of FIG. 2 permits the detection and measurement of the width of cavities and/or natural fractures present at the surface of the wellbore. Again, the cavity width and fractures may be shown on a monitor or printed as a log of borehole diameter. Similarly, the borehole tool of FIG. 2 enables the measurement of wellbore circumference, diameter, and ellipticity which may be similarly displayed. Further yet, the borehole tools of FIGS. 1 and 2 allow the in-situ measurement of the dynamic values of rock mechanical parameters such as Poisson's ratio and Young's modulus by means of a set of acoustic sensors that are mounted on the arm of the scratching tool. These measurements may likewise be displayed on a monitor or as a log plot. The borehole tools may be deployed in vertical, horizontal and deviated wells.

Figure 3:
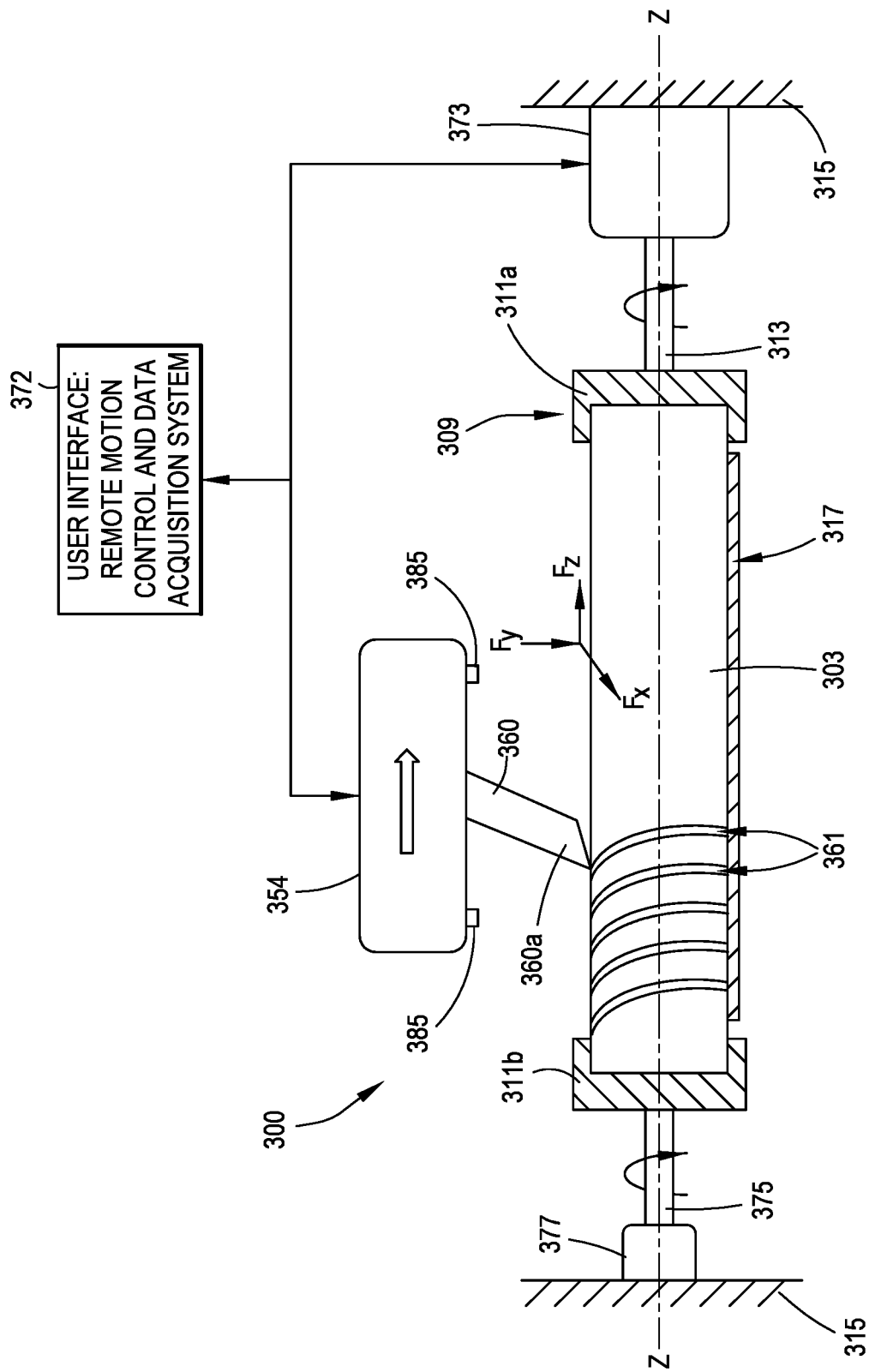
FIG. 3 is a side view of a scratch test system adapted to test a rock sample.

Turning now to FIG. 3, another embodiment of a scratch test apparatus that generates helical grooves is shown. In the embodiment of FIG. 3, the scratch test apparatus 300 for a core sample 303 includes a sample holder 309 having adjustable end caps 311a, 311b which are rotatable via at least one motorized rotating rod 313 extending from a fixed frame 315, an optional fixed support 317, and a movable horizontal or linear frame or platform 354 with a cutter arm 360 having a cutting element or tip 360a extending therefrom toward the core sample 303. In one embodiment the cutter tip 360a is a polycrystalline diamond cutter (PDC). The movable horizontal frame 354 supports the cutter arm 360 and is provided with one or more motors and a set of displacement sensors allowing the reversible adjustment of the vertical position of the cutter arm 360 as well as its inclination with respect to the axis of the core (Z-Z). A control panel 372 which in one embodiment includes a user interface installed on a computer may be used to control the motors that rotate the rod 313, translate the moving platform 354, and adjust the cutter arm 360. The cutter arm 360 may also include a support assembly attached to a load cell (not shown) installed in the horizontal frame platform 354 and having a set of sensors to measure the force required to maintain a constant depth of cut (groove 361) into the sample 303.

In the embodiment shown in FIG. 3, end cap 311a is attached to rod 313 of motor 373, and end cap 311b is attached to the main fixation frame 315 of the system via rod 375 and a swivel or rod holder 377. In one embodiment, rod 313 and/or rod 375 is a cylindrical rod having a length which can be either adjusted manually or automatically via the user interface to accommodate core samples with different lengths. In other words, end caps 311a and 311b may be moved relative to each other along the axis Z-Z. In addition, in one embodiment, the diameters of the end caps 311a, 311b can be adjusted either manually or automatically via the user interface to accommodate core samples with different dimeters. Once fixed, both end caps have the ability to rotate in a clockwise or counterclockwise direction while holding the core sample 303 and not allowing it to slide inside the end caps.

In one embodiment, in order to eliminate the possibility of uncontrollable bending moment developing due to the cutter moving towards the center of the sample, a freely rotating rod(s) 317 that supports the core along the exposed length may be used to support the core on its bottom (i.e., the side opposite the cutter) and/or sides.

In one embodiment, the cutter arm 360 has a tip (cutting element) that is angled relative to the longitudinal axis Z-Z of the core sample 303, including the case when the cutter arm is aligned out of the plane passing through the axis of the cylinder to accommodate for helical scratch. In embodiments, this angle may be adjusted either manually or automatically. Depending on the target rock core sample 303, the cutter arm 360 may have a tip (cutting element) shaped as a needle or provided with a circular or rectangular cross section.

With the provided system, if the sample holder with the core sample 303 is rotated at a fixed speed (causing a rotation of the cutter relative to the core) with the cutter engaging the core sample 303, and the horizontal frame 354 with the cutter 360 is likewise moved longitudinally at a fixed speed, the resulting groove 361 carved by the cutter 360 in the core sample will have a 3-D helical spiral form. It will be appreciated that in contrast to a conventional scratch test where the sample is scratched only along a line parallel to the longitudinal axis Z-Z of the core sample, the helical scratch in the rock is effectively a scratch which cuts in various directions in a single run. The pitch of the spiral scratch is defined as the linear travel distance of the cutter per one 360-degree rotation of the core sample. By adjusting the speed of horizontal motion motor and/or the rotational motion, the pitch of the scratch can be increased or reduced to obtain the desired mapping resolution. Therefore, the resolution of the measured unconfined compressive strength and the frequency of digital image acquisition as described hereinafter are controllable depending on the desired spacing between the rotation circles (pitches).

According to one aspect, the coordinates of the cutter in the 3-D space (x, y, z) can be acquired by sensors or controllers (the data acquisition system) in order to build a 3-D profiling of the UCS which can be used in the characterization of heterogeneity and anisotropy of the core. By way of example, assume a core sample having a 4-inch (0.1016 meter) diameter×1-meter length, where the rock exhibits strength anisotropy which is manifested in scratch resistance S (or UCS index) varied depending on the direction of the scratch. Such anisotropy in scratch resistance may be imposed by the microstructural features of the rock caused by the depositional environment. Let $S_3>0$ be the maximum scratch resistance which is achieved along the scratch direction $\bar{e}_3$. Let $S_1>0$ be the minimum scratch resistance which is achieved along the direction $\bar{e}_1$. Assume that directions (or unit length vectors) $\bar{e}_1$ and $\bar{e}_3$ are orthogonal to each other, (i.e., $\bar{e}_1 \perp \bar{e}_3$), which corresponds to the case when minimum and maximum strength is achieved when scratching along and across the depositional layers. Scratch resistance in any other direction t will fall between these 2 bounds: $S_1 \leq S(t) \leq S_3$. Further, let $S_2$ be the scratch resistance along the direction $\bar{e}_2$, which is orthogonal to $\bar{e}_1$ and $\bar{e}_3$. Now an arbitrary scratch direction t can be identified by its direction cosines $\gamma_i$, i=1, 2, 3: $t=\gamma_1 \bar{e}_1 + \gamma_2 \bar{e}_2 + \gamma_3 \bar{e}_3$, $\gamma_1^2 + \gamma_2^2 + \gamma_3^2 = 1$. As the simplest model for the scratch resistance value S(t), one can take a weighted average sum of the values $S_1$, $S_2$ and $S_3$ with squared direction cosines as weight factors:

$$S(t) = \gamma_1^2 S_1 + \gamma_2^2 S_2 + \gamma_3^2 S_3, \gamma_i = \cos{(\widehat{t, \bar{e}_i})}, i=1,2,3. \quad (1)$$

If one defines the symmetric matrix $\hat{S}=S_{ij}$, $S_{ij}=S_{ji}$, which has $S_i$ and $\bar{e}_i$, $|\bar{e}_i|=1$, i=1, 2, 3, as its eigenvalues and eigenvectors (or principal directions): $\hat{S}\bar{e}_i = S_i \bar{e}_i$, then equation (1) can be rewritten as a matrix-vector product:

$$S(t) = (t, \hat{S}t). \quad (2)$$

In cases when the core sample was drilled along one of the principal directions $\bar{e}_i$, matrix $\hat{S}$ will be diagonal. For example, if the direction of the Z-axis along the core coincides with the direction $\bar{e}_3$ of the maximum scratch resistance, one will obtain:

$$\hat{S} = \begin{pmatrix} S_1 & 0 & 0 \\ 0 & S_2 & 0 \\ 0 & 0 & S_3 \end{pmatrix}. \quad (3)$$

If the coring direction did not coincide with the principal directions of scratch resistance, matrix $\hat{S}$ is a full symmetric matrix.

Figure 4:
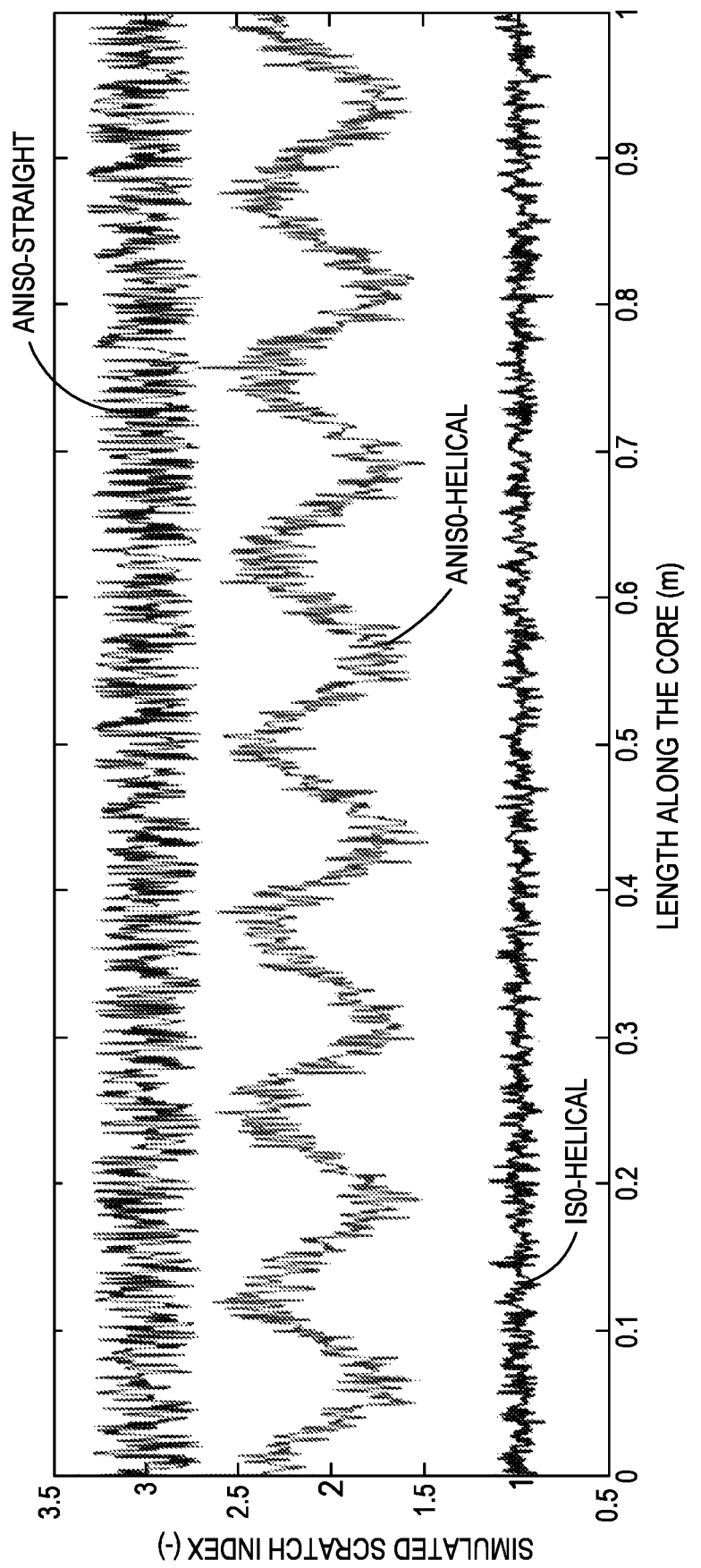
FIG. 4 is a graph of simulated scratch resistance measured for an anisotropic core during a helical scratch test, a conventional (straight) scratch test, and for an isotropic core during a helical scratch test.

Using the above model, one can simulate the scratch resistance value (or index) S measured during a helical scratch test. Assume that the rock possesses anisotropic scratch resistance with $S_1=1$, $S_2=2$ and $S_3=3$, and the core was drilled along the direction of maximum scratch resistance. Also assume that the scratched section of the core is homogenous having the principal values $S_i$ and directions $\bar{e}_i$ unchanged along the length. Admitting local perturbations to the measured scratch resistance (represented here as a random noise within 10% of the average value of $S_i$), the simulated scratch resistance is shown in FIG. 4. Here, the top and middle curves show the scratch resistance of the same core sample measured with a conventional (straight) scratch and a helical scratch, respectively. As expected, the top curve is essentially flat (except for the noise), meaning that the scratch anisotropy may be overlooked in conventional methods. Meanwhile, the helical method is clearly sensitive to the presence of material anisotropy. Results for a helical scratch of an isotropic rock is also shown in the bottom curve of FIG. 4 and provides a flat profile (except for the noise).

More complex models may be proposed for a realistic description of the scratch resistance dependence on the scratch direction. Also, real reservoir rocks are often heterogenous meaning that the measured profiles change along the length of the core and even abruptly. However, the above analysis with FIG. 4 shows the sensitivity of the helical scratch measurements to the rock anisotropy which the conventional scratch apparatus and method do not have.

In one embodiment, multiple helical scratch tests may be performed on a sample with different pitches, thereby enriching the measured scratch data with results obtained at additional scratch orientations. The obtained data is then used to build the scratch (strength) anisotropy model along the core, which may particularly include the orientation of the depositional layers.

Returning to FIG. 3, and according to one aspect, one or more cameras 385 (two shown) may be installed on the moving horizontal frame 354 to enable visual inspection of the rock sample surface before, during and after scratching.

In one embodiment, the cameras are micro-sized, high-speed, high-resolution cameras. The cameras 385 can be switched remotely via the user interface 372. The captured photographs and/or videos will be acquired, displayed, and processed in the user interface during the test to help with checking the quality of the measured UCS. Photos and videos can also be recorded for future detailed post-test analysis. By way of example only, three cameras might be provided. The first camera can be used to inspect the rock surface ahead of the cutter before scratching. The second camera can be directed at the cutter location to capture the cutting process, with focus on the process zone development and rock failure mode. The third camera can be installed behind the cutter to inspect the scratched zone (groove). This will provide the operator with means to derive rock typing through an artificial intelligence approach using image recognition.

Figure 5:
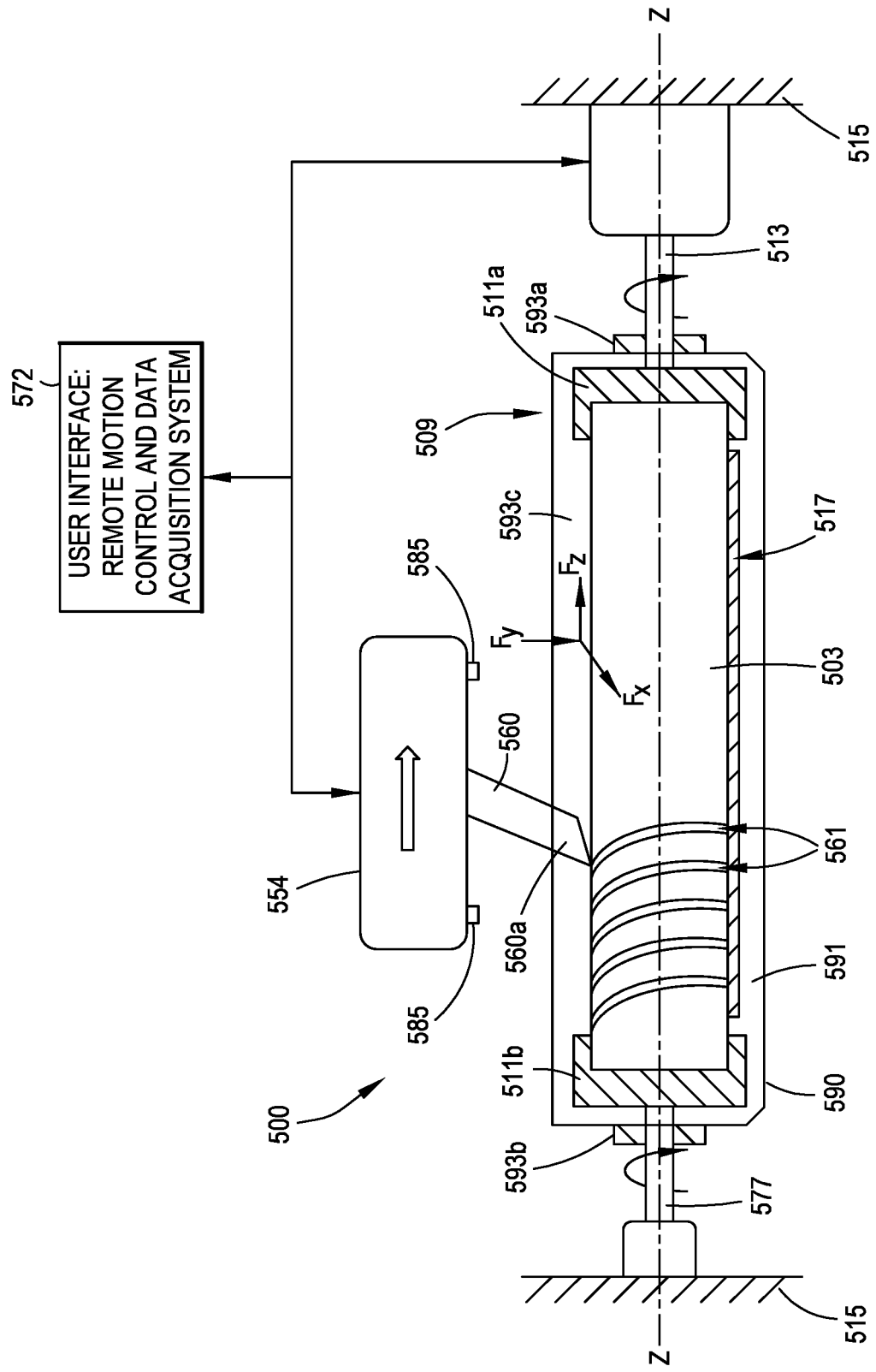
FIG. 5 is a side view of an embodiment of a scratch test system adapted to test a rock sample contained in a bath.

Another embodiment for a scratcher that cuts helical grooves into a rock is seen in FIG. 5. Scratcher 500 for core sample 503 is very similar to scratcher 300 as it includes a sample holder 509 having adjustable end caps 511a, 511b which are rotatable via at least one motorized rotating rod 513 extending from a fixed frame 515, an optional fixed support 517, a movable horizontal or linear frame or platform 554 with a cutter arm 560 (and cutting element or tip 560a) extending therefrom toward the core sample 503, and a control panel 572, which in one embodiment includes a user interface installed on a computer which may be used to control the motors that rotate the rod 513, translate the platform 554, and adjust the cutter arm 560. The cutter arm 560 may also include a support assembly attached to a load cell (not shown) installed in the horizontal frame platform 554 and having a set of sensors to measure the force required to maintain a constant depth of cut (groove 561) into the sample 503. Cameras 585 may also be provided on the horizontal frame 554. The primary difference between scratcher 500 and scratcher 300 of FIG. 3 is that scratcher 500 also includes a container 590 containing a bath liquid 591 in which the sample holder 509 is located. Thus, as seen in FIG. 5, the adjustable end caps 511a, 511b and the support 517 are all located in the container 590 containing liquid 591, and motorized rod 513 and rod 577 extending from frame 515 to caps 511a and 511b extend through the wall of the container 590 and through the liquid 591. To prevent leakage, seal 593a, 593b are provided at the entry of the rods to the bath. A slit seal 593c may also be provided through which the cutter arm 560 extends.

In embodiments, the liquid 591 contained in the container 590 may be water, oil, an oil/water mixture, drilling, completion or fracturing fluids, a mud, or any combination thereof. Indeed, in oilfield applications the reservoir rocks are generally saturated, and the reservoir engineer may wish to assess the effect of lubrication on the tangential force applied by the cutter, and hence on the measured UCS. Therefore, saturating the sample in a liquid bath allows a more realistic testing of the reservoir rock and better estimation of the UCS of the rock.

In another embodiment, bath container 590 may include a heating system (e.g., electrical heating elements) that directly or indirectly heats the core sample. In one embodiment the heating system heats the liquid 591 and hence the core sample to a given temperature in order to simulate real reservoir conditions. In this manner, the impact of temperature on rock geomechanical characteristics, such as, elasticity, brittleness, ductility resulting in the UCS measurements of the rock sample may be determined. In another embodiment, the heating system may be installed on the faces of end caps of the core holder in contact with rock. In yet another embodiment, part or all of the scratcher mechanical system may be located in an oven. These systems can be controlled either manually or remotely to adjust the desired temperature of the core at which the test will be conducted.

Accordingly, with the scratching systems of FIGS. 3 and 5, helical (spiral) cuts may be made in rocks (cores), and a 3-D mapping of rock heterogeneity may be performed. Similarly, a 3-D measurement of unconfined compressive strength may be made. Further yet, a 3-D imaging of the rock sample by the means of cameras to permit a determination of rock type may be made. A 3-D mapping of natural fractures at different scales may also be conducted, with or without the use of cameras. With the system of FIG. 5, the rock sample may be saturated with any desired fluid (such as oil, water, mud, etc.), and the sample may be heated. Also, with the system of FIG. 5, rock cementation factors can be derived from the rock strength and a mineralogical analysis of rock powder generated from the scratching process.

Figure 6C:
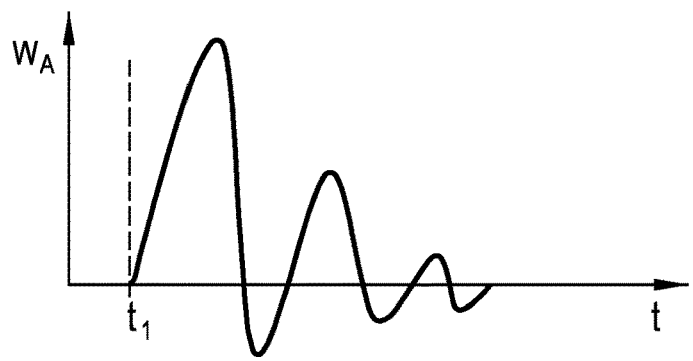
FIGS. 6c and 6d are example waveforms sensed by adjacent sensors of FIG. 6b.
Figure 6D:
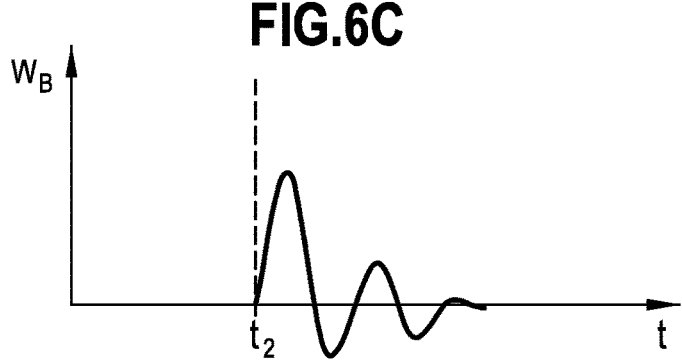

Turning now to FIGS. 6a and 6b, partial top and side views of a scratch test system 600 similar to the scratch test system 300 of FIG. 3 (while not showing all the details) are seen, but with added acoustic sensors 670a, 670b, 670c, 670d equally spaced (by distance d) along the long axis of the rock sample. FIGS. 6a and 6b show the rock sample 603, a movable horizontal or linear frame or platform 654 with a cutter arm 660 (and cutting element or tip 660a) extending therefrom toward the core sample 603, and sensors 670a-670d (only sensors 670a and 670b being shown in FIG. 6b). While the sensors are shown on or embedded in the core sample 603, one or more of the sensors 670a-670d may be located in or on different elements; e.g., on the cutter arm 660, on a support element (not shown) adjacent the core sample 603, or on the platform 654. The sensors are coupled to a data acquisition system (not shown) which can process information obtained by the sensors. In one embodiment, the acoustic sensors are passive sensors that may be used in generating a continuous rock heterogeneity profile related to the inherent mechanical properties of the rock sample. As the cutting element 660a travels along the length of the core sample 603 and scratches its surface, the resulting cracking of the grains and bonds between the grains is accompanied by a release of elastic energy. This release of elastic energy generates elastic waves (W in FIG. 6b) that can be sensed and recorded by the sensors as acoustic signals, as suggested by FIGS. 6c and 6d which show example waveforms from sensors 670a and 670b, with the waveform of FIG. 6c showing a larger amplitude signal received at an earlier time t than the signal shown in FIG. 6d. According to one aspect, there is an inherent correlation between the mechanical properties of each grain and the elastic signal it generates when it cracks. Specifically, the specific energy released by the local deformation of the rock is unique to the local mineralogy of the rock at the cutter position. Therefore, an acoustic signal signature that is unique to the mechanical properties of various zones along the surface of the core can be generated. Thus, the acoustic signal adds a continuous measurement profile that is sensitive to rock fabric and mineralogical composition and reproduces the heterogeneity of the mechanical properties of the rock core.

Both the amplitude and the time delay of the acoustic emissions from the cracked surface may be utilized in the generation of the continuous profile correlated to the mechanical properties. The energy that is released during the deformation of a grain is proportional to the amplitude squared of the acoustic signal that is emitted. According to one aspect, by correlating the amplitude of the signal, the relative strength of the grains (or the local rock volume in which the rock failure happens) of various rocks can be estimated. In one embodiment, the acoustic signal emitted during the rock scratching process can be acquired by one or more acoustic sensors, e.g., attached to the cutter. In another embodiment, where an array of acoustic sensors is attached to the core sample itself 603 or does not move with the platform 654, the rock cutter can be considered as a moving source of acoustic waves traveling through the sample. A profile of the variation of the strength along the length of the core can be computed and used to measure the heterogeneity of the rock mass of the core. Acoustic signal velocity, amplitude and time-delay are primarily controlled by minerology and how far the signal source on the cutter is from the receiver. Variations in acoustic wave readings in amplitude and time, with respect to a single receiver data at different times or with respect to different receivers at the same scratcher-to-receiver distance, are due to several factors. Those factors include variable rock porosity, microstructure, the presence of secondary minerals, and other mechanical properties.

Figure 7:
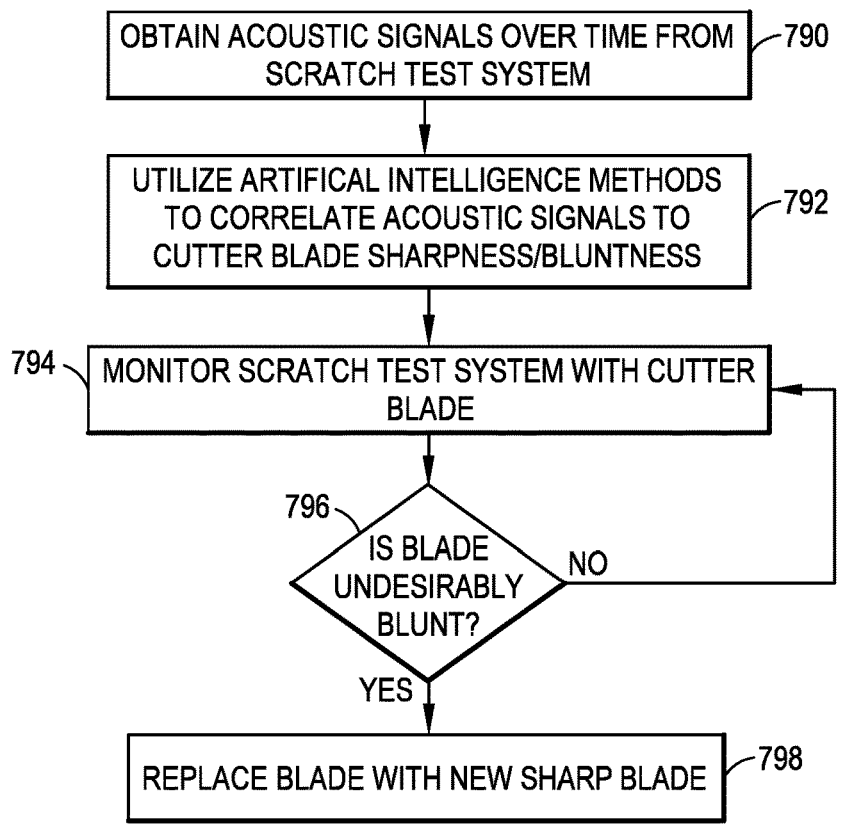
FIG. 7 is a flow diagram of a method for monitoring cutter blade sharpness.

According to another aspect, and as suggested by FIG. 7, the sharpness (or conversely, the bluntness) of the cutter element tip or blade may be monitored in real time using an analysis of the acoustic signals obtained by the one or more sensors 670a-670d. More particularly, at 790, acoustic signals are obtained over time for the scratch test system 600. At 792, artificial intelligence methods utilizing processors which may be part of the user interface and data acquisition system (not shown) are applied to the acquired passive acoustic signals to evaluate sharpness/bluntness (wear) of cutter blades. Then, at 794, the scratch test system with a current blade is monitored by comparing the acoustic signals obtained by acoustic sensors to previously stored signals representing blades of different sharpnesses. If at 796, the cutter blade or tip 660a is determined to be undesirably blunt (which could result in lower data quality and testing protocol efficiency), the blunt blade may be replaced at 798 by the operator of the system with a new sharp blade.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. By way of example, while the laboratory scratchers are shown provided with single cutting elements, they may be provided with multiple cutting elements which may be rotationally and/or axially offset. Also, while the downhole scratcher tools are shown as having separate axial and rotational motorized elements to permit different carving of grooves at different pitches, in one embodiment, the tool body may be provided with a helical track and a single motorized element with the cutter arm may engage that helical track in order to generate a helical groove in the borehole wall. Further, while acoustic sensors and cameras have been described in conjunction with different embodiments, the different embodiments may include both acoustic sensors and cameras and other sensors, if desired. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A scratch tester, comprising:
   a first cutter arm;
   a first cutting element extending from the first cutter arm and configured to engage a borehole surface of a borehole in a rock, wherein a controller is configured to control movement of the first cutting element simultaneously both rotationally and axially relative to the borehole in the rock to cut a first curved path in the borehole surface to define a three-dimensional scratch in the rock, wherein the first curved path comprises a first plurality of curved path portions spaced apart from one another along the borehole surface; and
   a tool body and at least two centralizers extending from the tool body that center the tool body in the borehole, wherein the first cutter arm is located between the at least two centralizers.

2. The scratch tester of claim 1, wherein the first curved path comprises a first spiral path having the first plurality of curved path portions along the borehole surface.

3. The scratch tester of claim 1, wherein the scratch tester further comprises a motorized platform with the first cutter arm coupled to the platform, wherein the motorized platform translates between the at least two centralizers to controllably move the cutter arm axially relative to the borehole surface, wherein the first cutting element extends away from the tool body and the motorized platform toward the borehole surface.

4. The scratch tester of claim 3, wherein the tool body has at least one rail engaged by the motorized platform.

5. The scratch tester of claim 3, wherein the motorized platform has a circumferential rail or groove and a rotating motorized element engaging the circumferential rail or groove on which the first cutter arm rotates to controllably move the first cutter arm rotationally relative to the borehole surface.

6. The scratch tester of claim 1, wherein the first cutter arm is rotatable from a first angle substantially parallel to a longitudinal axis of the tool body and a second angle which is angled away from the longitudinal axis of the tool body such that the first cutting element engages the borehole surface, wherein the first and second angles are different from one another.

7. The scratch tester of claim 1, wherein the first cutter arm includes at least one of displacement sensors and load sensors.

8. The scratch tester of claim 1, further comprising one or more acoustic sensors configured to monitor acoustics of cutting by the first cutting element, wherein the controller is configured to characterize the rock based on the acoustics.

9. The scratch tester of claim 1, further comprising a second cutter arm and a second cutting element extending from the second cutter arm, wherein the controller is configured to control movement of the second cutting element simultaneously both rotationally and axially relative to the borehole in the rock to cut a second curved path in the borehole surface to further define the three-dimensional scratch in the rock, wherein the second curved path comprises a second plurality of curved path portions spaced apart from one another along the borehole surface.

10. The scratch tester of claim 9, wherein the second cutter arm and second cutting element are rotationally displaced relative to the first cutter arm and first cutting element.

11. The scratch tester of claim 10, further comprising dampers on the tool body for the first cutting arm and the second cutting arm.

12. The scratch tester of claim 9, wherein the first curved path comprises a first spiral path having the first plurality of curved path portions along the borehole surface, and the second curved path comprises a second spiral path having the second plurality of curved path portions along the borehole surface.

13. The scratch tester of claim 1, wherein the controller is configured to adjust a speed of relative rotational movement and a speed of relative axial movement of the first cutting element to define the first curved path, wherein the controller is configured to control an angular movement of the first cutter arm relative to a longitudinal axis of the tool body to adjust an inclination angle of the first cutter arm.

14. An apparatus for investigating a formation traversed by a borehole, comprising:
a tool body;
a centralizer extending from the tool body that centers the tool body in the borehole;
a platform adapted to move axially along the tool body;
an arm coupled to and extending from the platform and adapted to move axially with the platform and rotationally relative to the platform;
a rotational movement sensor and an axial movement sensor;
a data acquisition system coupled to the rotational movement sensor and the axial movement sensor;
a sharp cutting element extending from the arm into engagement with a surface of the borehole to cut a curved path in the surface, wherein the arm is configured to rotate to adjust an inclination angle relative to a longitudinal axis of the tool body; and
at least one sensor coupled to the arm or the cutting element, the at least one sensor sensing a property of the formation rock engaged by the cutting element.

15. The apparatus of claim 14, wherein the at least one sensor comprises at least one of a displacement sensor, a load sensor, and an acoustic sensor.

16. The apparatus of claim 15, further comprising a telemetry module adapted to send information obtained from the at least one sensor to equipment located at the surface of the formation.

17. The apparatus of claim 16, further comprising motors adapted to cause the platform to move axially and to cause the arm to move rotationally relative to the platform at relatively constant rates relative to each other to resultingly cause the sharp cutting element to cut the curved path in the surface of the borehole, wherein the telemetry module is adapted to receive control information from the equipment located at the surface to control the motors and speeds of the linear and rotational motions, wherein the curved path comprises a spiral path having a plurality of curved path portions spaced apart from one another along the surface of the borehole.

18. The apparatus of claim 16, further comprising a display that displays at least one of rock heterogeneity, anisotropy, Poisson's ratio and Young's modulus as a function of azimuth along a length of the borehole.

19. A scratch tester, comprising:
a tool body;
a first cutter arm coupled to the tool body;
a first cutting element extending from the first cutter arm and configured to engage an annular surface of a rock; and
a controller configured to control a relative movement simultaneously both rotationally and axially between the first cutting element and the annular surface of the rock to cut a first curved path in the annular surface to define a three-dimensional scratch in the rock, wherein the first curved path comprises a first plurality of curved path portions spaced apart from one another along the annular surface.

20. The scratch tester of claim 19, wherein the first curved path comprises a first spiral path having the first plurality of curved path portions along the annular surface.

21. The scratch tester of claim 19, further comprising a second cutter arm and a second cutting element extending from the second cutter arm, wherein the controller is configured to control the relative movement simultaneously both rotationally and axially between the second cutting element and the annular surface of the rock to cut a second curved path in the annular surface to further define the three-dimensional scratch in the rock, wherein the second curved path comprises a second plurality of curved path portions spaced apart from one another along the annular surface.

22. The scratch tester of claim 21, wherein the first curved path comprises a first spiral path having the first plurality of curved path portions along the annular surface, and the second curved path comprises a second spiral path having the second plurality of curved path portions along the annular surface.

23. The scratch tester of claim 19, wherein the controller is configured to control an angular movement of the first cutter arm relative to a longitudinal axis of the tool body to adjust an inclination angle of the first cutter arm.

24. The scratch tester of claim 19, further comprising one or more acoustic sensors configured to monitor acoustics of cutting by the first cutting element, wherein the controller is configured to characterize the rock based on the acoustics.

25. The scratch tester of claim 19, further comprising one or more acoustic sensors configured to monitor acoustics of cutting by the first cutting element, wherein the controller is configured to determine a sharpness of the first cutting element based on the acoustics.

26. The scratch tester of claim 19, wherein the first cutter arm is configured to rotate to adjust an inclination angle relative to a longitudinal axis of the tool body.

27. The scratch tester of claim 19, wherein the annular surface comprises a borehole surface of a borehole in the rock or an exterior surface of a sample of the rock.

* * * * *